United States Patent
Remesch

(10) Patent No.: US 12,504,538 B2
(45) Date of Patent: Dec. 23, 2025

(54) DISTANCE-VELOCITY DISAMBIGUATION IN HYBRID LIGHT DETECTION AND RANGING DEVICES

(71) Applicant: Waymo LLC, Mountain View, CA (US)

(72) Inventor: Bryce Remesch, Hollis, NH (US)

(73) Assignee: Waymo LLC, Mountain View, CA (US)

( * ) Notice: Subject to any disclaimer, the term of this patent is extended or adjusted under 35 U.S.C. 154(b) by 1177 days.

(21) Appl. No.: 17/444,463

(22) Filed: Aug. 4, 2021

(65) Prior Publication Data

US 2023/0039691 A1 Feb. 9, 2023

(51) Int. Cl.
| | |
|---|---|
| *G01S 17/58* | (2006.01) |
| *B60W 30/09* | (2012.01) |
| *B60W 60/00* | (2020.01) |
| *G01S 17/42* | (2006.01) |
| *G01S 17/931* | (2020.01) |

(52) U.S. Cl.
CPC ............ *G01S 17/58* (2013.01); *B60W 30/09* (2013.01); *B60W 60/001* (2020.02); *G01S 17/42* (2013.01); *G01S 17/931* (2020.01); *B60W 2420/408* (2024.01); *B60W 2554/404* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 5,574,537 A | 11/1996 | Ozawa | |
| 8,112,223 B2 | 2/2012 | Jordan et al. | |
| 9,851,470 B2 | 12/2017 | Henderson et al. | |
| 10,436,906 B2 | 10/2019 | Droz | |
| 2002/0140924 A1* | 10/2002 | Wangler | G01S 7/4802 356/28 |
| 2005/0213075 A1 | 9/2005 | Cooke | |

(Continued)

FOREIGN PATENT DOCUMENTS

CN 111999739 A 11/2020

OTHER PUBLICATIONS

Aeye Idar "iDAR is Smarther than LiDAR", aeye.ai/idar/, retrieved Oct. 20, 2020, 11 pages.

(Continued)

*Primary Examiner* — Hovhannes Baghdasaryan
(74) *Attorney, Agent, or Firm* — Lowenstein Sandler LLP

(57) ABSTRACT

The subject matter of this specification can be implemented in, among other things, a system that includes a first light source to produce a pulsed beam and a second light source to produce a continuous beam, a modulator to impart a modulation to the second beam, and an optical interface subsystem to transmit the pulsed beam and the continuous beam to an outside environment and to detect a plurality of signals reflected from the outside environment. The system further includes one or more circuits configured to identify associations of various reflected pulsed signals, used to detect distance to various objects in the environment, with correct reflected continuous signals, used to detect velocities of the objects. The one or more circuits identify the associations based on the modulation of the detected continuous signals.

20 Claims, 8 Drawing Sheets

(56) References Cited

U.S. PATENT DOCUMENTS

| | | |
|---|---|---|
| 2010/0128744 A1 | 5/2010 | Deladurantaye et al. |
| 2012/0249998 A1* | 10/2012 | Eisele .................. G01S 7/4816 |
| | | 356/5.01 |
| 2013/0027240 A1 | 1/2013 | Chowdhury |
| 2013/0044309 A1 | 2/2013 | Dakin et al. |
| 2018/0180739 A1 | 6/2018 | Droz |
| 2019/0086518 A1 | 3/2019 | Hallstig et al. |
| 2019/0195665 A1 | 6/2019 | Soga et al. |
| 2019/0265334 A1 | 8/2019 | Zhang et al. |

OTHER PUBLICATIONS

Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.
Lekavich, John, "Basics fo Acousto-Optic Devices", Lasers & Applications Apr. 1986, pp. 59-64.
Marino, A.M. et al., "Phase-Locked Laser System for Use in Atomic Coherence Experiments", Review of Scientific Instruments 79, 013104 (2008), published online Jan. 11, 2008, pp. 013104-1-013104-8.
International Search Report and Written Opinion dated Mar. 30, 2022, on application No. PCT/US2021/061481, 10 pages.
International Search Report and Written Opinion dated Feb. 7, 2022, on application No. PCT/US2021/055093, 14 pages.

\* cited by examiner

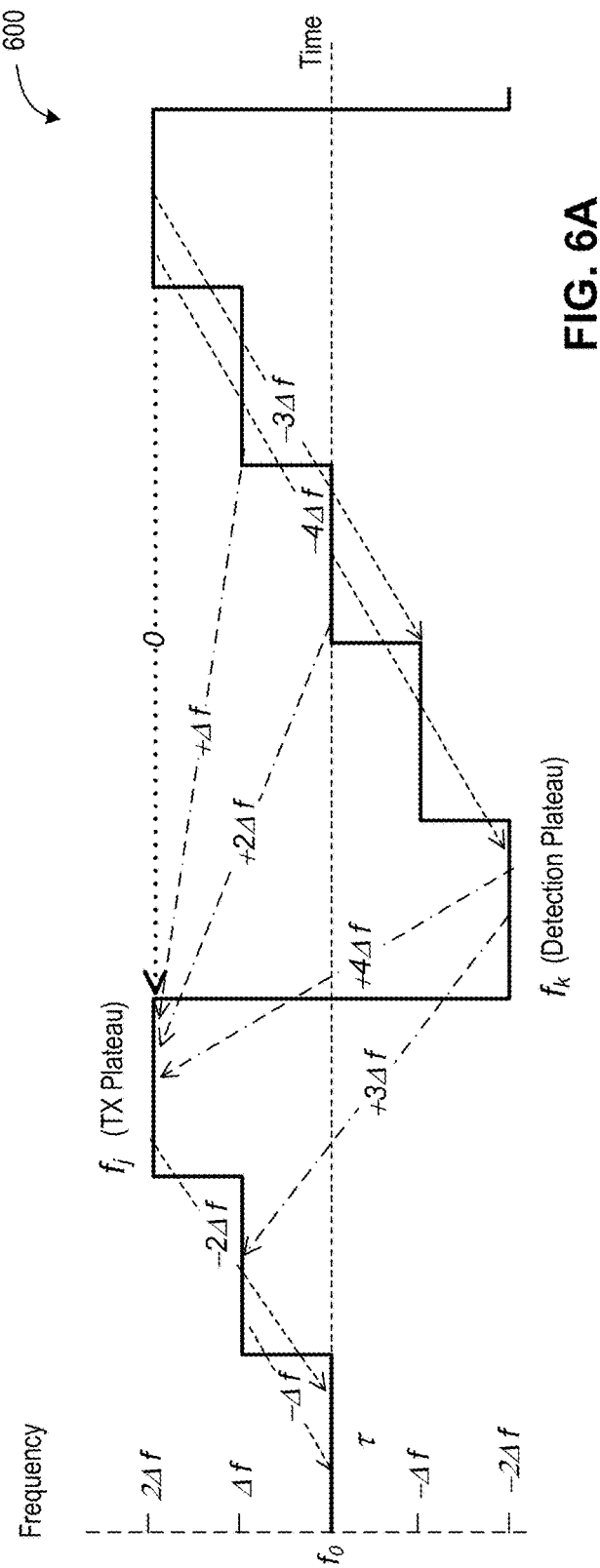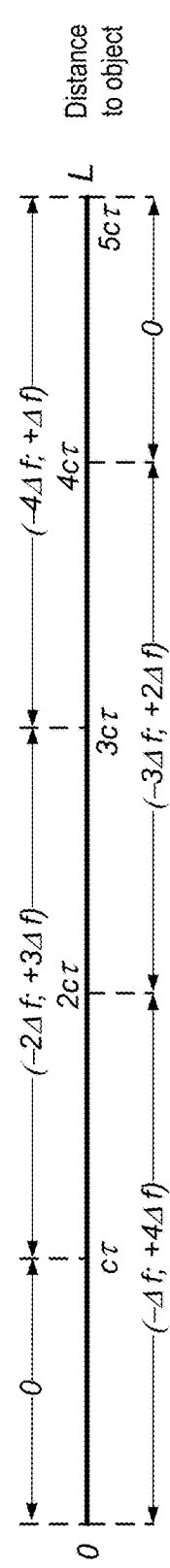

DISTANCE-VELOCITY DISAMBIGUATION IN HYBRID LIGHT DETECTION AND RANGING DEVICES

TECHNICAL FIELD

The instant specification generally relates to distance and velocity sensing in applications that involve determining locations and velocities of moving objects. More specifically, the instant specification relates to hybrid lidars, in which distance and velocity are measured using separate channels.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (e.g., radio, optical, infrared) sensors and charting a driving path through the environment based on the sensed data. Additionally, the driving path can be determined based on positioning (e.g., Global Positioning System (GPS)) and road map data. While the positioning and the road map data can provide information about static aspects of the environment (buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 4A illustrates a symmetric "staircase" frequency modulation that uses eight different frequency values, each implemented for a particular time interval. FIG. 4B illustrates an asymmetric staircase frequency modulation that uses fifteen different frequency values each implemented for a specific time interval. FIG. 4C illustrates a directional staircase with resets, in which frequency is monotonically increased from a minimum frequency to a maximum frequency followed by a reset back to the minimum frequency.

FIG. 6A and FIG. 6B further illustrate identification of a range of distances by a hybrid lidar system using an example directional frequency staircase encoding, in accordance with some implementations of the present disclosure. FIG. 6A illustrates the frequency encoding of FIG. 4C, which uses five different values of frequency. FIG. 6B illustrates identification of the ranges of distances based on beating frequencies by a hybrid lidar that uses directional frequency staircase encoding of FIG. 6A.

SUMMARY

Figure 1:
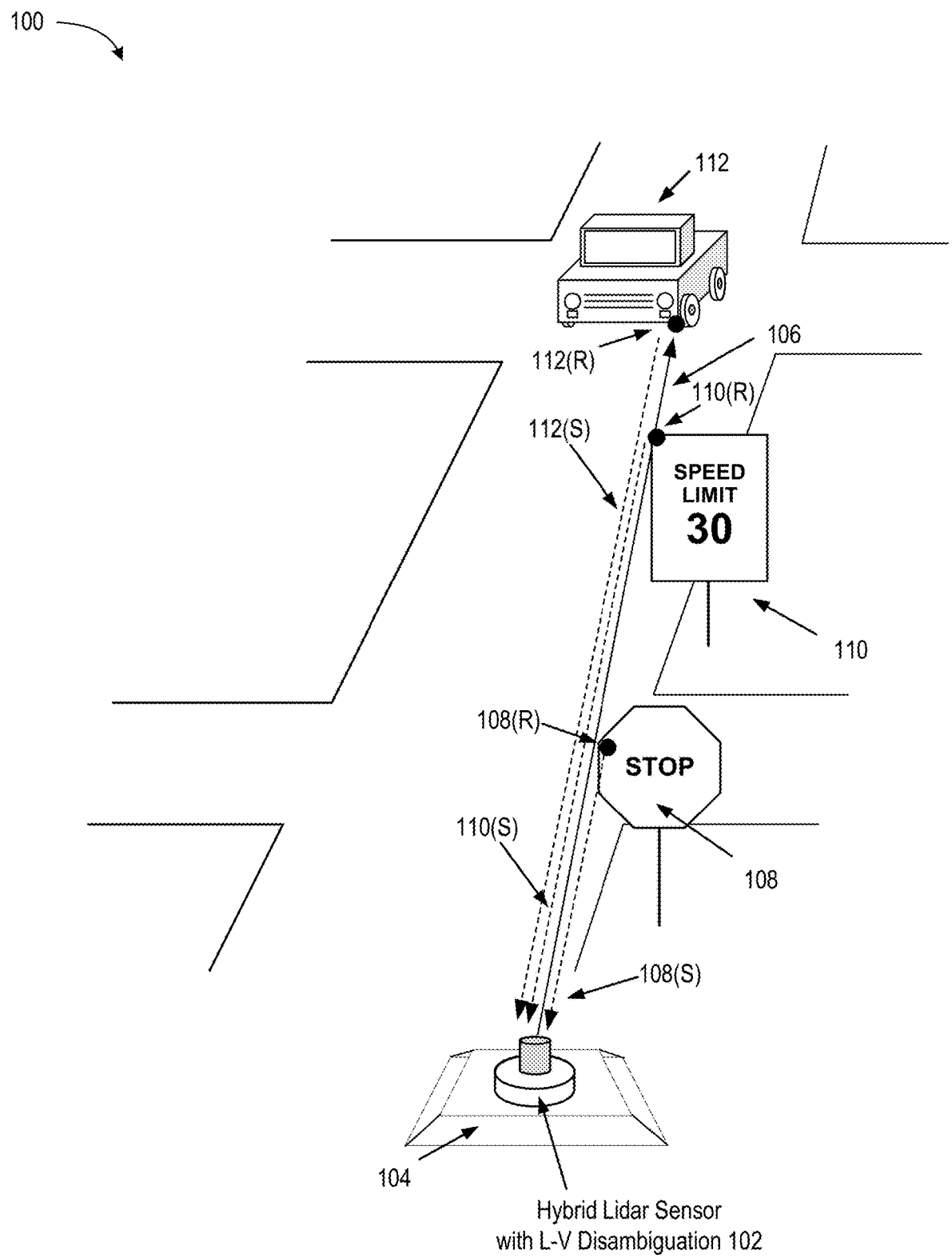
FIG. 1 is a schematic illustration of advantages of a hybrid lidar sensor that uses velocity-distance disambiguation, in accordance with some implementations of the present disclosure.

In one implementation, disclosed is a system that includes a first light source configured to produce a first beam comprising one or more pulses, and a second light source configured to produce a second beam, wherein the second beam is a continuous beam. The system further includes a modulator configured to impart a modulation to the second beam and an optical interface subsystem configured to: transmit the first beam and the second beam to an outside environment, and receive, from the outside environment, a plurality of received (RX) signals caused by at least one of the first beam or the second beam. The system further includes one or more circuits configured to determine that a first RX signal of the plurality of RX signals and a second RX signal of the plurality of RX signals are reflected by a same object, wherein the first RX signal is representative of a distance to the object and the second RX signal is representative of (i) a velocity of the object, and (ii) an interval of possible distances to the object, the interval of possible distances being identified based on the modulation of the second RX signal.

In another implementation, disclosed is a sensing system of an autonomous vehicle (AV), the sensing system including an optical system configured to: produce a first beam comprising one or more pulses, the first beam centered at a first frequency, produce a second beam, wherein the second beam is a continuous beam centered at a second frequency different from the first frequency, impart an angle modulation to the second beam, transmit the first beam and the second beam to an environment of the AV, and receive, from the environment of the AV, a plurality of received (RX) signals caused by at least one of the first beam or the second beam. The sensing system further includes a signal processing system configured to: determine that a first RX signal of the plurality of RX signals and a second RX signal of the plurality of RX signals are reflected by a same object in the environment of the AV, wherein the first RX signal is representative of a distance to the object and the second RX signal is representative of (i) a velocity of the object, and (ii) an interval of possible distances to the object, the interval of possible distances being identified based on the angle modulation of the second RX signal, and associate the distance to the object, determined from the first RX signal, with the velocity of the object, determined from the second RX signal.

In another implementation, disclosed is a method that includes producing a first beam comprising one or more pulses, producing a second beam, wherein the second beam is a continuous beam, imparting a modulation to the second beam, transmitting the first beam and the second beam to an outside environment, receiving, from the outside environment, a plurality of received (RX) signals caused by at least one of the first beam or the second beam; and determining that a first RX signal of the plurality of RX signals and a second RX signal of the plurality of RX signals are reflected by a same object, wherein the first RX signal is representative of a distance to the object and the second RX signal is representative of (i) a velocity of the object, and (ii) an interval of possible distances to the object, the interval of possible distances being identified based on the modulation of the second RX signal.

DETAILED DESCRIPTION

An autonomous vehicle can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the retro-reflected waves, a time-of-flight (ToF) lidar can determine the distance to the object. A typical lidar emits signals in multiple directions to obtain a wide view of the outside environment. The outside environment can be any environment in which the autonomous vehicle can operate, including any urban (e.g., street) environment, rural environment, highway environment, indoor (e.g., warehouse) environment, marine environment, and so on. The outside environment can include multiple stationary objects (roadways, buildings, bridges, road signs, shoreline, rocks, etc.), multiple movable objects (e.g., vehicles, bicyclists, pedestrians, animals, ships, boats, etc.), and/or any other objects located outside the AV. For example, a lidar device can scan an entire 360-degree view and collect a series of consecutive frames identified with timestamps. As a result, each sector in space is sensed in time increments $\Delta\tau$, which are determined by the angular velocity of the lidar's scanning speed. "Frame" or "sensing frame," as used herein, can refer to an entire 360-degree view of the outside environment obtained over a scan of the lidar or, alternatively, to any smaller sector, e.g., a 1-degree, 5-degree, a 10-degree, or any other angle obtained over a fraction of the scan cycle (revolution), or over a scan designed to cover a limited angle.

ToF lidars can also be used to determine velocities of objects in the outside environment, e.g., by detecting two (or more) locations $\vec{r}(t_1)$, $\vec{r}(t_2)$ of some reference point of an object (e.g., the front end of a vehicle) and inferring the velocity as the ratio, $$\vec{v} = \frac{\vec{r}(t_2) - \vec{r}(t_1)}{t_2 - t_1}.$$

By design, the measured velocity $\vec{v}$ is not the instantaneous velocity of the object but rather the velocity averaged over the time interval $t_2-t_1$, as the ToF technology does not allow one to ascertain whether the object maintained the same velocity $\vec{v}$ during this time interval or experienced an acceleration or deceleration (with detection of acceleration/deceleration requiring additional locations $\vec{r}(t_3)$, $\vec{r}(t_4)$ ... of the object for $t_3, t_4 \in (t_1, t_2)$).

Coherent lidars operate by detecting a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the outside environment. A local copy (referred to as a local oscillator (LO) herein) of the transmitted signal can be maintained on the lidar and mixed with a signal reflected from the target; a beating pattern between the two signals can be extracted and Fourier-analyzed to determine the Doppler shift and identify the radial velocity of the target. A frequency-modulated continuous-wave (FMCW) lidar can be used to determine the target's velocity and distance to the lidar using a single beam. The FMCW lidar uses beams that are modulated (in frequency and/or phase) with radio frequency (RF) signals prior to being transmitted to a target. RF modulation can be sufficiently complex and detailed to allow detection, based on the relative shift (caused by the time-of-flight delays) of RF modulation of the LO copy and RF modulation of the reflected beam.

FMCW lidars utilize high precision technology and are complex and expensive devices. A less expensive option can be to use a hybrid lidar device in which the ToF range-finding technology is combined with the velocity-finding Doppler technology. A hybrid lidar can have two (or more) lidar components. Each lidar component can output separate laser beams and collect separate pieces of information about the target using the output beam. For example, a first lidar component can use pulsed beams configured for accurate detection of a distance to the target. A second lidar component can output a continuous beam and detect Doppler frequency shift of the reflected signal for accurate detection of the target's velocity. The two lidar components can be combined on a single platform that allows for a concurrent transmission of the beams along the same optical path (while the hybrid lidar scans the outside environment). When reflection from a single target object is detected, such a hybrid lidar can provide excellent functionality and determine the distance to the object and the object's radial velocity with a high accuracy. Yet on those occasions where multiple objects are present along the optical path, the use of a hybrid device can result in ambiguities in associating distance returns with velocity returns.

FIG. 1 is a schematic illustration 100 of advantages of a hybrid lidar sensor that uses velocity-distance disambiguation, in accordance with some implementations of the present disclosure. Depicted schematically is a hybrid lidar sensor 102 mounted on a section 104 (e.g., a roof) of an autonomous vehicle (not shown) that may scan an outside environment of the AV. Hybrid lidar sensor 102 can output a combined beam 106 (depicted with a solid arrow) that can generate returns (reflections) from multiple objects, such as a stop sign 108, a speed limit sign 110, and a vehicle 112. The returns may be generated by reflecting surfaces that are located close to the line of the combined beam 106, e.g., by reflecting surfaces 108(R), 110(R), and 112(R). As a result, three reflected signals 108(S), 110(S), and 112(S) may be generated (depicted with dashed arrows), each carrying information about the velocities of each three respective reflecting surfaces 108(R), 110(R), and 112(R) and distances to the three reflecting surfaces. Because each hybrid lidar component processes a corresponding part of the reflected signals (pulsed or continuous) independently from processing of the other part, a hybrid lidar can be unable to disambiguate from different distance-velocity (often referred to in this disclosure as "L-V") associations. In an instance where N velocities and N distances are detected from N different objects, there could be N factorial (N!) possible pairings of these returns. For example, if three velocity returns (1, 2, 3) and three distance returns (1', 2', 3') are received, there could be 3 factorial (i.e. 3!=6) possible pairwise associations: 1-1', 2-2', 3-3'; 1-1, 2-3', 3-2'; 1-2', 2-3', 3-1'; etc.) Although FIG. 1 depicts a situation of a combined lidar beam "skirting" various objects, in some instances, a combined lidar beam may pass through some of the objects. For example, a part of the combined lidar beam can reflect from a windshield of a first vehicle, while another part of the beam passes through the windshield but reflects back from the rear window of the first vehicle. Yet another part of the beam can pass through the rear window of the first vehicle and reflect from a second vehicle (or some other object, e.g., a pedestrian, a road sign, a building, etc.).

Aspects and implementations of the present disclosure enable methods and systems that achieve efficient distance-velocity disambiguation of the received (RX) signals that are reflected from objects in outside environments and allow one to correctly associate distance returns of a pulsed transmitted (TX) beam with returns of a continuous TX beam. In some implementations, L-V disambiguation can be achieved by imparting a phase information (e.g., frequency or phase modulation) to the continuous beam output by the hybrid lidar. The phase information can include a number of markers sufficient for association of velocity returns with a range of distances $\Delta L$ around a set of central distances $L_1$, $L_2, L_3 \ldots$ . For example (as described in more detail below), based on a comparison of a phase information of a continuous RX signal with a phase information of a LO copy of the TX beam, the distance to an object having a detected velocity $V_A$ can be coarsely determined to be within a range of $[L_1-\Delta L/2, L_1+\Delta L/2]$. Using a more accurate prediction obtained using pulsed RX returns, a return distance $L_B$ within this specific range $L_B \in [L_1-\Delta L/2, L_1+\Delta L/2]$ can be selected. A return point can then be identified as $(L_B, V_A)$. This return point (alone or in conjunction with other return points) can then be utilized for object identification using any of the known methods of clustering, iterative closest points (ICP) algorithms, and so on. In some implementations, instead of imparting a phase or frequency modulation to the continuous beam, the continuous beam can be amplitude-modulated, with an amplitude encoding providing similar markers to enable L-V disambiguation.

Advantages of the disclosed implementations include, on one hand, efficient disambiguation of distance and velocity sensing signals compared with other hybrid lidars lacking such functionality. On the other hand, disclosed implementations have an advantage of simplicity and lower costs compared with FMCW lidars, which provide detailed distance information based solely on the continuous beams. Frequency, phase, or amplitude modulation of the continuous beam in hybrid lidars can be performed in a significantly coarser manner (than in FMCW lidars), as the continuous beam has only to identify a rough interval of distances. Such a coarser determination can be sufficient because additional high-accuracy distance data is independently available from pulsed beam returns (wherein in an FMCW the continuous beam is also the source of the distance information). Correspondingly, a hybrid lidar with L-V disambiguation has lower demands (compared with FMCW lidars) to the bandwidth for transmission of phase/frequency/amplitude information that is to be imparted in the continuous beam (as significantly fewer phase markers need to be transmitted and reliably detected). Similarly, a hybrid lidar has lower requirements for the accuracy of digital (e.g., Fast Fourier Transform) processing as well as other electronics components. Additional benefits of the disclosed implementations include substantial precision-to-cost advantages, decreased demands to accuracy of laser sources and/or optical modulators and the associated electronics.

Figure 2:
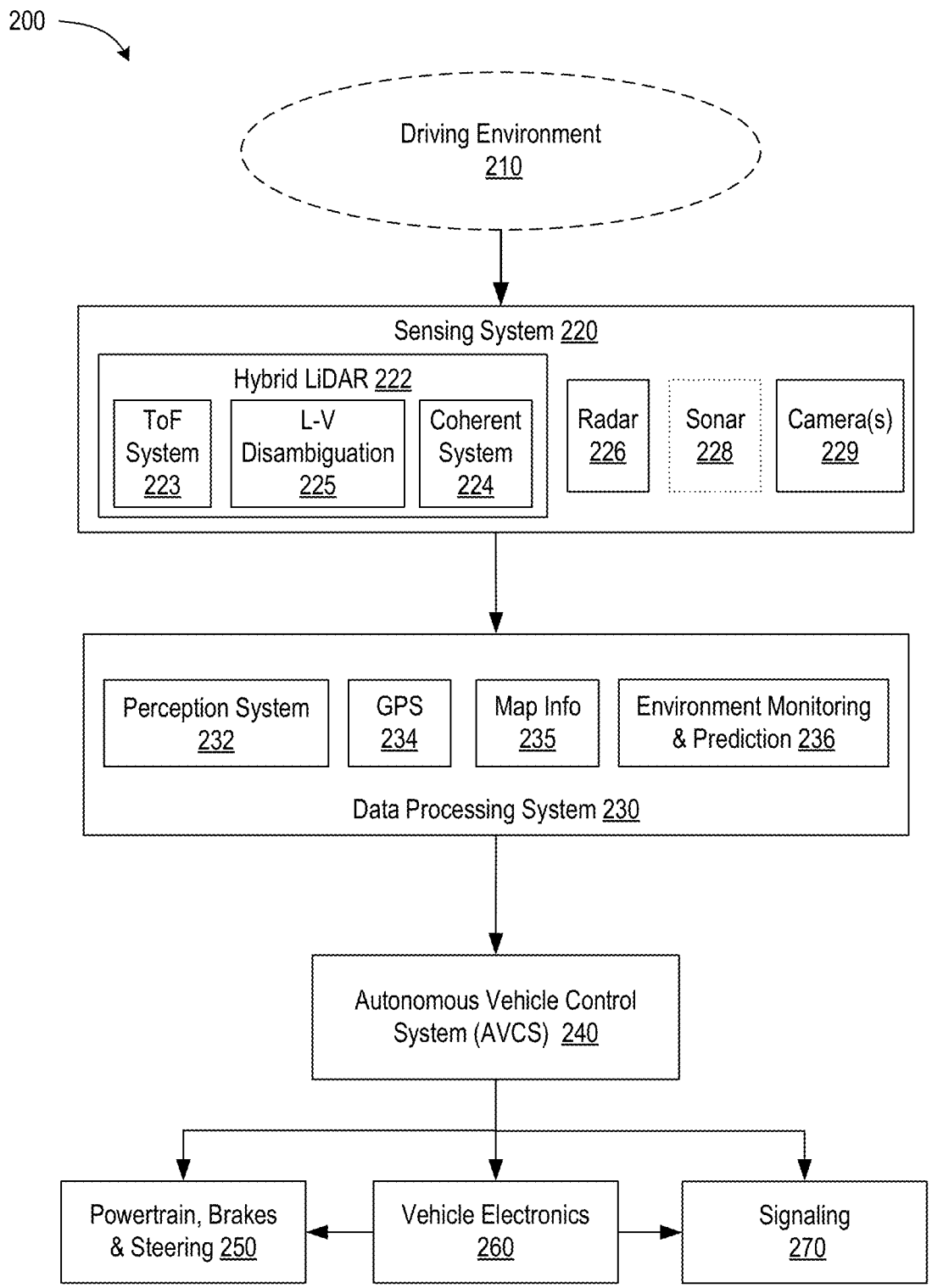
FIG. 2 is a diagram illustrating components of an example autonomous vehicle that uses one or more hybrid lidars with distance-velocity disambiguation, in accordance with some implementations of the present disclosure.

FIG. 2 is a diagram illustrating components of an example autonomous vehicle (AV) 200 that uses one or more hybrid lidars with distance-velocity disambiguation, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 210 can be or include any portion of the outside environment containing objects that can determine or affect how driving of the AV occurs. More specifically, a driving environment 210 can include such objects (animate or inanimate) located outside the AV as roadways, buildings, trees, bushes, sidewalks, bridges, overpasses, underpasses, tunnels, construction zones, parking features, other vehicles, pedestrians, cyclists, and so on. The driving environment 210 can be urban, suburban, rural, and so on. In some implementations, the driving environment 210 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 210 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which motion of self-propelled vehicles can occur. For example, "driving environment" can include any possible flying environment of an aircraft or a marine environment of a naval vessel. The objects of the driving environment 210 can be located at any distance from the AV, from close distances of several feet (or less) to several miles (or more).

The example AV 200 can include a sensing system 220. The sensing system 220 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 220 can include a radar unit 226, which can be any system that utilizes radio or microwave frequency signals to sense objects within the driving environment 210 of the AV 200. The radar unit 226 can be configured to sense both the spatial locations of the objects (including their spatial dimensions) and their velocities (e.g., using the radar Doppler shift technology). The sensing system 220 can include a hybrid lidar 222 operating in accordance with implementations of the present disclosure. Hybrid lidar 222 can utilize wavelengths of electromagnetic waves that are shorter than the wavelength of the radio waves and can, therefore, provide a higher spatial resolution and sensitivity compared with the radar unit 226. Hybrid lidar 222 can include a ToF system 223 (e.g., a lidar rangefinder), which can be a laser-based unit capable of determining distances to the objects in the driving environment 210. Hybrid lidar 222 can further include a coherent system 224, which can use a continuous beam of light and optical homodyne or heterodyne detection for velocity determination. ToF system 223 and coherent system 224 can share any number of optical components and devices (e.g., lenses, mirrors, apertures, diffractive optical elements, beam splitters, optical amplifiers, and the like). ToF system 223 and coherent system 224 can be configured to output beams along the same optical path by combining the output beams into a single beam. The output beams can nonetheless retain their uniqueness (e.g., by having different wavelengths, polarization, etc.) and upon reflection from a target can be split (e.g., using beam splitters and/or diffractive elements) and processed using separate optical and electronic processing components. In some implementations, some of the processing (e.g., digital processing) of the received beams can be performed by components that are common for both ToF system 223 and coherent system 224.

Hybrid lidar 222 can further include L-V (distance-velocity) disambiguation 225, which should be understood as any number of physical components, elements, circuits, or software/firmware modules that enable association of distance returns with correct velocity returns (or vice versa). For example, L-V disambiguation 225 can include an optical modulator to impart angle modulation (e.g., phase and/or frequency modulation) or amplitude modulation to a continuous beam output by the coherent system 224. L-V disambiguation 225 can further include digital (or analog) processing that identifies modulation of RX signals, compares the identified modulation with the modulation of the LO copies of TX beams, and determines possible distance ranges (intervals) for various objects that generate velocity returns.

ToF system 223 and/or coherent system 224 can include one or more laser sources producing and emitting signals and one or more detectors of the signals reflected back from the objects. ToF system 223 and/or coherent system 224 can include spectral filters to filter out spurious electromagnetic waves having wavelengths (frequencies) that are different from the wavelengths (frequencies) of the emitted signals. In some implementations, ToF system 223 and/or coherent system 224 can include directional filters (e.g., apertures, diffraction gratings, and so on) to filter out electromagnetic waves that can arrive at the detectors along directions different from the directions for the emitted signals. ToF system 223 and/or coherent system 224 can use various other optical components (lenses, mirrors, gratings, optical films, interferometers, spectrometers, local oscillators, and the like) to enhance sensing capabilities of the sensors.

In some implementations, multiple hybrid lidars 222 can be mounted on the same AV, e.g., at different locations separated in space, to provide additional information about a transverse component of the velocity of the reflecting object. In some implementations, hybrid lidar(s) 222 can be 360-degree scanning unit(s) in a horizontal direction. In some implementations, hybrid lidar(s) 222 can be capable of spatial scanning along both the horizontal and vertical directions. In some implementations, the field of view can be up to 90 degrees in the vertical direction (e.g., with that at least a part of the region above the horizon can be scanned by the lidar signals or with at least part of the region below the horizon scanned by the lidar signals). In some implementations, e.g., involving aeronautical applications, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths, where applicable.

The sensing system 220 can further include one or more cameras 229 to capture images of the driving environment 210. The images can be two-dimensional projections of the driving environment 210 (or parts of the driving environment 210) onto a projecting plane of the cameras (flat or non-flat, e.g. fisheye cameras). Some of the cameras 229 of the sensing system 220 can be video cameras configured to capture a continuous (or quasi-continuous) stream of images of the driving environment 210. The sensing system 220 can also include one or more sonars 228, which can be ultrasonic sonars, in some implementations.

The sensing data obtained by the sensing system 220 can be processed by a data processing system 230 of AV 200. In some implementations, the data processing system 230 can include a perception system 232. Perception system 232 can be configured to detect and track objects in the driving environment 210 and to recognize/identify the detected objects. For example, the perception system 232 can analyze images captured by the cameras 229 and can be capable of detecting traffic light signals, road signs, roadway layouts (e.g., boundaries of traffic lanes, topologies of intersections, designations of parking places, and so on), presence of obstacles, and the like. The perception system 232 can further receive the lidar sensing data to determine distances to various objects in the driving environment 210 and velocities (radial and transverse) of such objects. In some implementations, perception system 232 can use the lidar data in combination with the data captured by the camera(s) 229. In one example, camera(s) 229 can detect an image of road debris partially obstructing a traffic lane. Using the data from the camera(s) 229, perception system 232 can be capable of determining the angular extent of the debris. Using the lidar data, the perception system 232 can determine the distance from the debris to the AV and, therefore, by combining the distance information with the angular size of the debris, the perception system 232 can determine the linear dimensions of the debris as well.

In another implementation, using the lidar data, the perception system 232 can determine how far a detected object is from the AV and can further determine the component of the object's velocity along the direction of the AV's motion. Furthermore, using a series of quick images obtained by the camera, the perception system 232 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 232 can receive one or more sensor data frames from the sensing system 220. Each of the sensor frames can include multiple points. Each point can correspond to a reflecting surface from which a signal emitted by the sensing system 220 (e.g., by hybrid lidar 222) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 232 can further receive information from a positioning subsystem, which may include a GPS transceiver (not shown), an inertial mechanical unit (IMU), and/or other systems configured to obtain information about the position of the AV relative to Earth and its surroundings. The positioning data processing module 234 can use the positioning data, e.g., GPS and IMU data) in conjunction with the sensing data to help accurately determine location of the AV with respect to fixed objects of the driving environment 210, such as roadways, lane boundaries, intersections, sidewalks, crosswalks, road signs, curbs, surrounding buildings, and so on, locations of which can be provided by map information 235. In some implementations, the data processing system 230 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 230 can further include an environment monitoring and prediction component 236, which can monitor how the driving environment 210 evolves with time, e.g., by keeping track of the locations and velocities of the animated objects (relative to Earth). In some implementations, environment monitoring and prediction component 236 can keep track of the changing appearance of the driving environment due to motion of the AV relative to the driving environment. In some implementations, environment monitoring and prediction component 236 can make predictions about how various animated objects of the driving environment 210 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, environment monitoring and prediction component 236 can conclude that object 1 is resuming its motion from a stop sign or a red traffic light signal. Accordingly, environment monitoring and prediction component 236 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, environment monitoring and prediction component 236 can conclude that object 2 is stopping at a stop sign or at a red traffic light signal. Accordingly, environment monitoring and prediction component 236 can predict where object 2 is likely to be within the next 1 or 3 seconds. Environment monitoring and prediction component 236 can perform periodic checks of the accuracy of its predictions and modify the predictions based on new data obtained from the sensing system 220.

The data generated by the perception system 232, the GPS data processing module 234, and environment monitoring and prediction component 236 can be used by an autonomous driving system, such as AV control system (AVCS) 240. The AVCS 240 can include one or more algorithms that control how AV is to behave in various driving situations and driving environments. For example, the AVCS 240 can include a navigation system for determining a global driving route to a destination point. The AVCS 240 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 240 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 240 can generate instructions for various systems and components of the vehicle, such as the powertrain, brakes, and steering 250, vehicle electronics 260, signaling 270, and other systems and components not explicitly shown in FIG. 2. The powertrain, brakes, and steering 250 can include an engine (internal combustion engine, electric engine, and so on), transmission, differentials, axles, wheels, steering mechanism, and other systems. The vehicle electronics 260 can include an on-board computer, engine management, ignition, communication systems, carputers, telematics, in-car entertainment systems, and other systems and components. The signaling 270 can include high and low headlights, stopping lights, turning and backing lights, horns and alarms, inside lighting system, dashboard notification system, passenger notification system, radio and wireless network transmission systems, and so on. Some of the instructions outputted by the AVCS 240 can be delivered directly to the powertrain, brakes, and steering 250 (or signaling 270) whereas other instructions outputted by the AVCS 240 are first delivered to the vehicle electronics 260, which generate commands to the powertrain and steering 250 and/or signaling 270.

In one example, the AVCS 240 can determine that an obstacle identified by the data processing system 230 is to be avoided by decelerating the vehicle until a safe speed is reached, followed by steering the vehicle around the obstacle. The AVCS 240 can output instructions to the powertrain, brakes, and steering 250 (directly or via the vehicle electronics 260) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 240 can output instructions to the powertrain, brakes, and steering 250 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots), or any other self-propelled vehicles capable of being operated in a self-driving mode (without a human input or with a reduced human input). "Objects" can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

Figure 3:
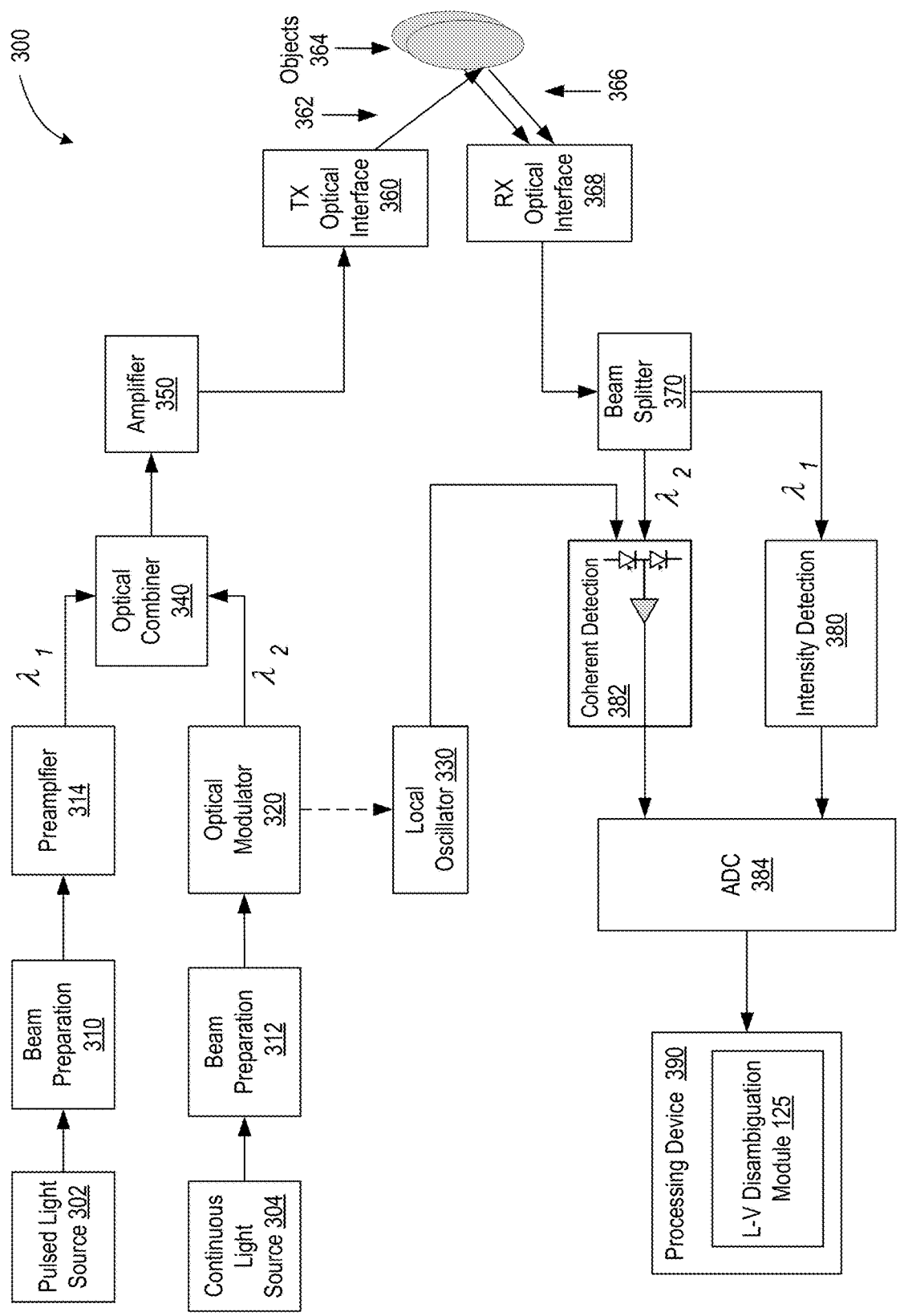
FIG. 3 is a block diagram illustrating an example implementation of a hybrid lidar that uses distance-velocity disambiguation, in accordance with some implementations of the present disclosure.

FIG. 3 is a block diagram illustrating an example implementation of a hybrid lidar 300 (e.g., hybrid lidar 222 of FIG. 2) that uses distance-velocity disambiguation, in accordance with some implementations of the present disclosure. Hybrid lidar 300 can include multiple light sources, such as a pulsed light source 302 and a continuous light source 304. Each light source is configured to produce one or more beams of light. "Beams" should be understood herein to refer to any signals of electromagnetic radiation, such as beams, wave packets, pulses, sequences of pulses, or other types of signals. Pulsed light source 302 and/or continuous light source 304 can use a broadband laser, a narrow-band laser, a light-emitting diode, a Gunn diode, and the like. Any of lasers utilized by pulsed light source 302 and/or continuous light source 304 can be a semiconductor laser, a gas laser, an ND:YAG laser, or any other type of a laser. Pulsed light sources 302 can utilize a single-pulse laser, a repetitively pulsed laser, and the like. Pulsed light sources 302 can be synchronized with a scanning mechanism (e.g., actuator) of the lidar transmitter. More specifically, pulsed light source 302 can generate one or any other number of pulses for each direction of scanning. Pulses generated by pulsed light source 302 can be monochromatic pulses a having central carrier frequency $\lambda_1$ in any suitable optical range (e.g., infrared) and a pulse duration that can be substantially greater than the period of the light oscillations, $\lambda_1/c$, but still substantially smaller than the time of flight to a typical target, L/c, where L is the distance to the target and c is the speed of light. Continuous light source 304 can produce a beam whose duration is substantially greater than the duration of pulses (and/or the time of flight to a typical target). The beam produced by continuous lights source 304 (herein often referred to as a continuous beam) can have a frequency $\lambda_2$ that is different from frequency $\lambda_1$. The term "continuous" should not be understood as an indication that the produced beam is always turned on. Instead, "continuous" indicates that the beam's duration can be, in some implementations, longer than the time of flight to a typical target, L/c.

In some implementations, pulses output by pulsed light source 302 and/or continuous beams output by light source 304 can be conditioned (pre-processed) by one or more components or elements of a beam preparation stages 310 and 312. Preprocessing can ensure a narrow-band spectrum, target linewidth, coherence, polarization (e.g., circular or linear), and other optical properties that enable measurements (e.g., coherent Doppler measurements) described below. Beam preparation can be performed using filters (e.g., narrow-band filters), resonators (e.g., resonator cavities, crystal resonators, etc.), polarizers, feedback loops, lenses, mirrors, diffraction optical elements, and other optical devices. For example, if the pulsed light source 302 is a broadband light source, the output light can be filtered to produce a narrowband beam. In some implementations, where pulsed light source 302 and continuous light source 304 produce beams that have a desired linewidth and coherence, the beams can still be additionally filtered, focused, collimated, diffracted, amplified, polarized, etc., to produce one or more beams of a desired spatial profile, spectrum, duration, frequency, polarization, repetition rate, and so on.

In some implementations, light output by pulsed light source 302 (and, in some implementations, continuous light source 304) can be additionally processed by a preamplifier 314. Preamplifier 314 can include (not shown) an additional pump laser, a combiner, and an optical amplifier. In some implementations, the pump laser is a single mode pump diode. In some implementations, the combiner of preamplifier 314 is a wavelength division multiplexer that combines a pulsed optical signal generated by pulsed light source 302 with a signal generated by the pump laser. In some implementations, the amplifier of pulsed light source 302 is an erbium-doped single-mode fiber. In some implementations, the amplifier of pulsed light source 302 is an erbium/ytterbium-doped dispersion-compensating fiber (Er/Yb-DCF). In some implementations, the amplifier may be a semiconductor optical amplifier (which may be further implemented as part of a photonic integrated circuit).

The light output by beam preparation stage 312 can be inputted into an optical modulator 320 to provide modulation to the continuous beam outputted by beam preparation stage 312. "Optical modulation" is to be understood herein as referring to any form of angle modulation, such as phase modulation (e.g., any temporal sequence of phase changes $\Delta\phi_j$ added to the phase of the beam), frequency modulation (e.g., any sequence of frequency changes $\Delta f_j$, either positive or negative), amplitude modulation, or any other type of modulation (e.g., a combination of phase and frequency modulation) that affects the phase of the wave. Amplitude modulation can be imparted, e.g., using a power amplifier that increases or reduces (possibly, down to zero amplitude) the amplitude of the continuous beam. Amplitude modulation can be applied to the light in combination with angle modulation or separately, without angle modulation. In some implementations, optical modulator 320 can be or include an acousto-optic modulator, an electro-optic modulator, a Lithium Niobate modulator, a heat-driven modulator, a Mach-Zender modulator, and the like, or any combination thereof.

In various implementations, phase shifts (and, similarly, frequency or amplitude changes) can have any number of values, e.g., N discrete phase values across the phase interval $2\pi$. A temporal sequence of phase shifts $\Delta\phi_j$ (phase encoding) can be added by a radio frequency (RF) source (or any other suitable source) outputting a signal (e.g., an RF electrical signal) to optical modulator 320. In some implementations, the RF signals applied to optical modulator 320 can cause optical modulator 320 to impart consecutive phase shifts $\Delta\phi_j$ to the continuous light beam. In some implementations, the RF signals applied to optical modulator 320 can cause optical modulator 320 to impart frequency shifts $\Delta f_j$ to the continuous light beam, e.g., a sequence of up-chirps interspersed with down-chirps. In some implementations, a power amplifier controlled by RF signals can impart amplitude changes $\Delta A_j$ to the continuous light beam. In one exemplary implementation, a period of phase or frequency encoding can be 2 µs with 10 different phase, frequency, or amplitude values of 0.2 µs duration used within each 2 µs period. As described below in relation to FIG. 5 and FIGS. 6A-B, the resolution of such an encoding would be $\Delta L=60$ m over each interval $L_0=300$ m (referred herein to as the maximum unambiguous range intervals), meaning that this phase/frequency encoding would be capable of distinguishing target objects located at distances 30 m<L<90 m from objects located at distances 90 m<L<150 m. At the same time, objects that are located at 125 m may provide a response that is similar to a response of an object located at 425 m (125 m+300 m). Disambiguation of objects located at distances that differ by an integer number of maximum unambiguous range intervals $L_0$ may then be enabled based on the intensity of reflected signals. Increasing the period of phase/frequency encoding increases the maximum unambiguous range interval $L_0$ whereas increasing the number of different phase/frequency values within the period of encoding increases resolution (decreases $\Delta L$).

After optical modulation, light output by optical modulator 320 can undergo spatial separation at a beam splitter (not depicted) to split off (dashed line) a local oscillator (LO) copy 330 of the modulated continuous beam. LO copy 330 can be used as a reference signal to which a signal reflected from a target can be compared. The beam splitter can be (or include) a prism-based beam splitter, a partially-reflecting mirror, a polarizing beam splitter, a beam sampler, a fiber optical coupler (optical fiber adaptor), or any similar beam splitting element (or a combination of two or more beam-splitting elements). The light beam can be delivered to the beam splitter (as well as between any other components depicted in FIG. 3) over air or over light carriers, such as optical fibers or other types of waveguide devices.

The signal copy of the light beam (solid line) can be delivered to optical combiner 340 to be combined with the pulsed beam output by preamplifier 314. Combining of the two beams can be performed to ensure that both beams follow the same optical path and, therefore, are output towards the same target. Even though, for brevity and conciseness, only LO copy 330 for the continuous beam is depicted in FIG. 3, it should be understood that a local oscillator copy of the pulsed beam can similarly be retained on the hybrid lidar 300 as a reference signal for subsequent processing of the reflected pulses.

The combined beam output by optical combiner 340 can be amplified by amplifier 350 before being outputted, through a transmission (TX) optical interface 360, as a TX beam 362 towards one or more objects 364, which can be objects in the driving environment 210 of FIG. 2. Optical interface 360 can include an aperture and a combination of optical elements, e.g., lenses, mirrors, collimators, polarizers, waveguides, and the like. Optical elements of TX optical interface 360 can be used to direct TX beam 362 to a desired region in the outside environment. Output TX beam 362 can travel to one or more objects 364 and, upon interaction with the respective objects, generate reflected beams (also referred to as RX signals) 366, which can enter hybrid lidar 300 via a receiving (RX) optical interface 368. In some implementations, RX optical interface 368 can share at least some optical elements with the TX optical interface 360, e.g., aperture, lenses, mirrors, collimators, polarizers, waveguides, and so on.

RX signals 366 can include both the pulsed signals and continuous signals reflected by objects 364. In some instances, RX signals 366 can include multiple returns (reflections) of the pulsed beam and multiple returns of the continuous beam. Multiple returns can be caused by multiple objects reflecting the same TX beam 362. For example, m returns (herein referred to as distance returns) of the pulsed beam and n returns of the continuous beam (herein referred to as velocity returns) can be received as part of RX signals 366. To associate at least some of the distance returns with velocity returns (or vice versa), hybrid lidar 300 can process such returns separately. Specifically, hybrid lidar 300 can include a beam splitter 370 capable of spatially separating distance returns from velocity returns. In some implementations, distance returns can have wavelength $\lambda_1$ that is different from wavelength of velocity returns $\lambda_2$. In such implementations, beam splitter 370 can include one or more optical elements that are sensitive to the wavelength of light, including diffraction optical elements, prisms having a frequency-dependent refractive index, wavelength-sensitive optical circulators, wavelength-division multiplexers, wavelength division couplers (e.g., fiber optic couplers), or any other dispersive optical elements capable of separating and directing light of different spectral content (e.g., wavelengths) along different optical paths. For example, RX signals associated with distance returns (wavelength $\lambda_1$) can be directed towards intensity detection module 380 whereas RX signals associated with velocity returns (wavelength $\lambda_2$) can be directed towards coherent detection module 382. Intensity detection module 380 can convert optical intensity of the RX signals to electrical signals, e.g., using photoelectric circuit elements (e.g., photodiodes) and provide electrical signals to an analog-to-digital converter (ADC) 384 for digitizing the intensity of the received distance returns $I_{RX}(t)$. A processing device 390 can then determine the shift (delay) in time of the distance returns compared with the intensity of the transmitted pulsed beam intensity $I_{TX}(t)$ (which can be available via a LO copy of the transmitted pulsed beam). Based on the time delay $t_{delay}$ of a maximum of $I_{RX}(t)$ compared with a maximum of $I_{TX}(t)$, the distance to the reflecting object 364 can be determined as $L=ct_{delay}/2$. (Factor ½ accounting for the fact that the signal travels the distance L to the object twice, before and after the reflection).

Coherent detection module 382 can include one or more filters to be applied to coherent components of RX signals 366. Filters can include matched filters (in the instances where phase modulation is being detected), frequency filters (when frequency modulation is being detected), amplitude/peak filters (when amplitude modulation is being detected), or any combination thereof. Coherent detection module 382 can process the velocity returns (wavelength $\lambda_2$) using one or more balanced photodetectors to detect phase information carried by the coherent component of RX signals 366. A balanced photodetector can have photodiodes connected in series and can generate ac electrical signals that are proportional to a difference of input optical modes (which can additionally be processed and amplified). A balanced photodetector can include photodiodes that are Si-based, InGaAs-based, Ge-based, Si-on-Ge-based, and the like. In some implementations, balanced photodetectors can be manufactured on a single chip, e.g., using complementary metal-oxide-semiconductor (CMOS) structures, silicon photomultiplier (SiPM) devices, or similar systems. Balanced photodetector(s) can also receive LO copy 330 of the continuous TX beam. A balanced photodetector can detect a phase difference between phases of the continuous TX beam and can output electrical signals representative of the information about relative phases of the RX signal and the continuous TX beam. The electrical signal output by coherent detection module 382 can be digitized by ADC 384 and processed by processing device 390 for distance-velocity disambiguation using L-V disambiguation module 125. Processing by processing device 390 can include using spectral analyzers, such as Fast Fourier Transform (FTT) analyzers, digital filters, mixers, local RF oscillators (e.g., carrying information about phase/frequency modulation imparted to the continuous beam by optical modulator 320), and any other suitable components and/or devices.

In some implementations, L-V disambiguation module 125 can obtain n distance values $L_1, L_2, \ldots L_n$ for n distance returns and compare those distance returns with m velocity returns $(V_1;[L_{1min},L_{1max}]), (V_2;[L_{2min},L_{2max}]), \ldots (V_m;[L_{m\ min},L_{m\ max}])$, that, in addition to (radial) velocities $V_j$, identify approximate (coarse) ranges of distances $[L_{j\ min},L_{j\ max}]$ to the reflecting objects associated with the respective returns. Having identified to which ranges of distances various distance values $V_k$ belong, L-V disambiguation module 125 of the processing device 390 can identify accurate distance-velocity associations $(L_k;V_j)$. For example, if L-V disambiguation module 125 identifies that $L_1 \in [L_{3min},L_{3max}]$, a first distance-velocity association can be identify as $(L_1;V_3)$. Other associations can be determined in a similar manner.

Figure 4A:
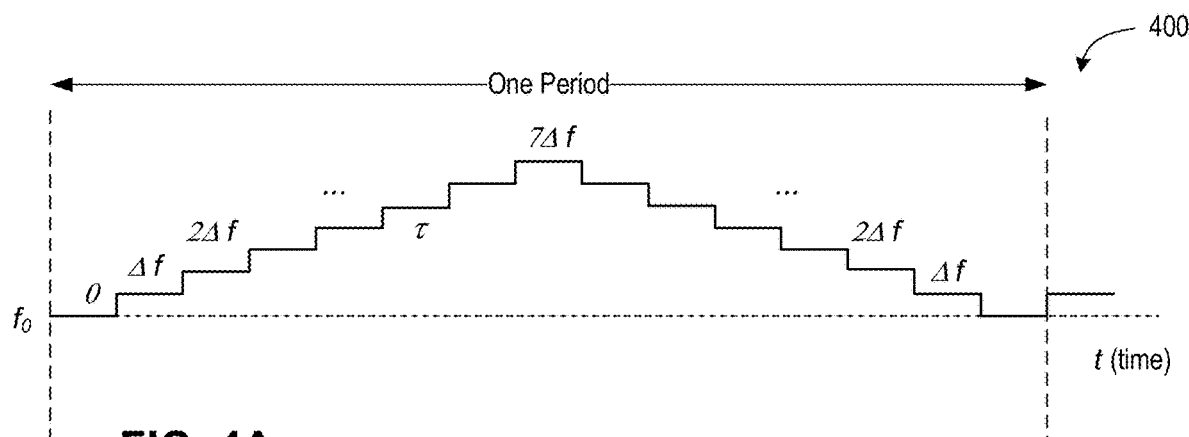
FIG. 4A, FIG. 4B, and FIG. 4C illustrate example implementations of frequency encodings that can be used to modulate a continuous beam output by a hybrid lidar, in accordance with some implementations of the present disclosure.
Figure 4B:
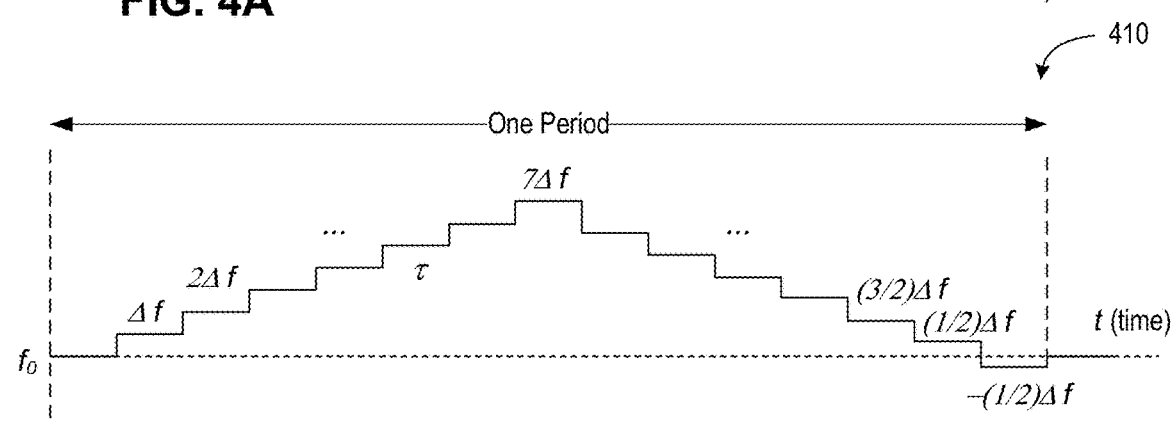
Figure 4C:
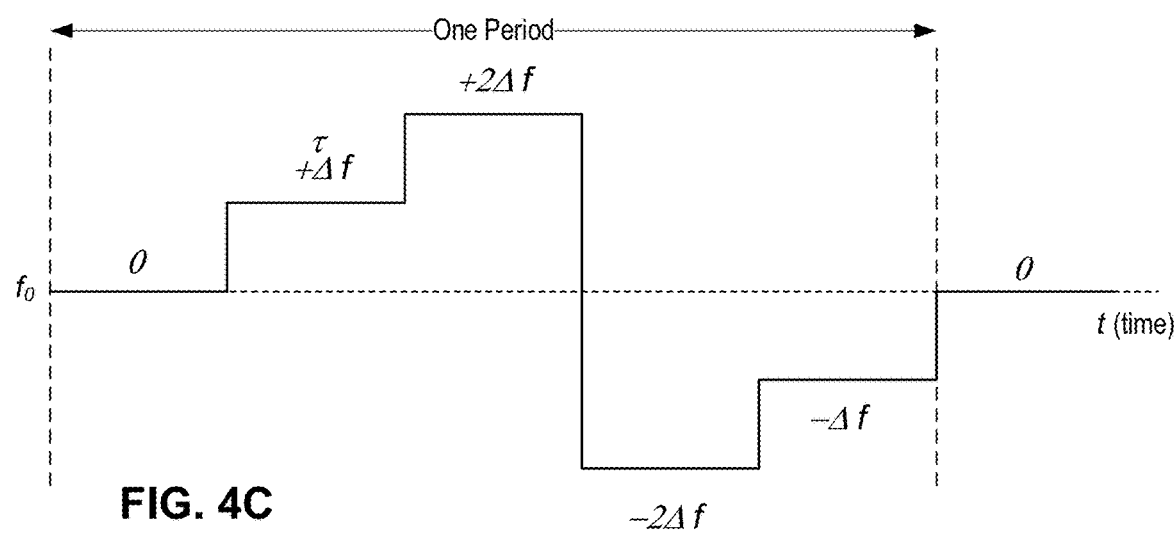

FIG. 4A, FIG. 4B, and FIG. 4C illustrate example implementations of frequency encodings that can be used to modulate a continuous beam output by a hybrid lidar, in accordance with some implementations of the present disclosure. Though the frequency encodings herein are illustrated for concreteness, it should be understood that other substantially similar encodings can be used for phase or amplitude modulation of the continuous beam. FIG. 4A illustrates a symmetric "staircase" frequency modulation 400 that uses eight different frequency values 0, $\Delta f$, $2\Delta f$, . . . $7\Delta f$ (e.g., counted from a base value $f_0$ set by continuous light source 304 of FIG. 3), each implemented for a particular time interval $\tau$. The modulation shown has a period $15\tau$ and is repeated multiple times. Any other number N of frequency values can be used instead, for example, four, ten, or any other number of frequency values. In some implementations, duration of at least some of the intervals can be different from $\tau$. FIG. 4B illustrates an asymmetric staircase frequency modulation 410 that uses fifteen different frequency values $$0, \Delta f, 2\Delta f, \ldots 6\Delta f, 7\Delta f, 5.5\Delta f, 4.5\Delta f, \ldots 0.5\Delta f, -0.5\Delta f,$$

each implemented for a specific time interval $\tau$. The modulation shown has a period $16\tau$ and can be repeated multiple times. The advantage of the modulation illustrated in FIG. 4B is that no two values within one period are the same, which (as described below in relation to FIGS. 5, 6A-B can be advantageous for improving distance resolution). Any other number N of frequency changes can be used instead. In some implementations, duration of at least some of the intervals can be different from $\tau$. FIG. 4C illustrates a directional staircase 420 with resets, in which frequency is monotonically increased from a minimum frequency (e.g., $-2\Delta f$) to a maximum frequency (e.g., $2\Delta f$) followed by a reset back to the minimum frequency. In some implementations, a directional staircase can have frequencies changing in the opposite direction, e.g., from a maximum to a minimum, with a reset back to the maximum frequency. In those implementations where N increasing (or decreasing) frequency values are used, one period of frequency modulation can be $N\tau$, if all time intervals have the same duration $\tau$. The advantage of the modulation illustrated in FIG. 4C (as explained below in relation to FIGS. 6A-B) is that the same detected frequency changes can be indicative of the same time delays regardless of where exactly such frequency changes occur on the staircase. In some implementations, duration of at least some of the intervals can be different from $\tau$. The example frequency (and, similarly, phase or amplitude) encodings are presented by way of illustration and not by way of limitation. It should be understood that practically numerous other various modulation sequences (e.g., as can be permitted by the bandwidth, bit-depth, and resolution of the electronics circuitry being used) can be used with the number of different frequency/phase/amplitude intervals and the duration of such intervals can be determined by a target accuracy of the distance disambiguation.

Figure 5:
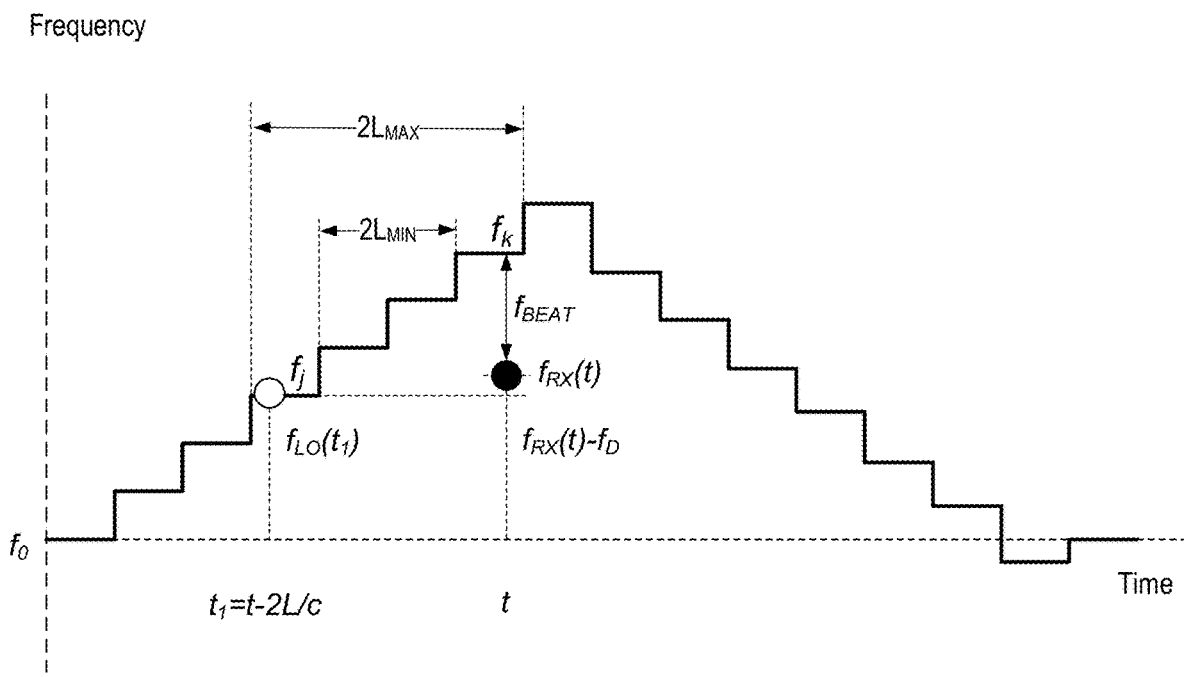
FIG. 5 illustrates identification of a range of distances by a hybrid lidar system that uses an example frequency encoding of a continuous beam, in accordance with some implementations of the present disclosure.

FIG. 5 illustrates identification 500 of a range of distances by a hybrid lidar system that uses an example frequency encoding of a continuous beam, in accordance with some implementations of the present disclosure. Depicted by a black dot is a frequency $f_{RX}(t)$ of the reflected RX signal generated upon reflection of the continuous beam from a particular target and arriving at the hybrid lidar at time t. Also depicted is an example staircase of the LO copy of the transmitted output beam. At the time of detection t, the LO copy has a frequency value $f_{LO}(t)$ that is within a k-th plateau, $f_k$. Using coherent detection module 382 (e.g., balanced photodetectors), the hybrid lidar can identify the beating frequency $f_{BEAT} = f_{LO}(t) - f_{RX}(t) = f_k(t) - _{RX}(t)$ and determine that the beating frequency points to a j-th plateau of the LO. The j-th plateau is, therefore, associated with a time in the past $t_1 = t - 2L/c$ (depicted with a white dot) when the signal was transmitted to the object. Note that the detected frequency $f_{RX}(t)$ can be different from the frequency of the transmitted beam, $f_j$, with the difference amounting to the Doppler shift, $f_{RX}(t) - f_j = 2Vf_j/c = 2V/\lambda_1$, caused by the motion of the object with a radial velocity V (V>0 if the object is moving towards the lidar, and V<0 if the object is moving away). In order for the hybrid lidar to identify the association of the detected frequency $f_{RX}(t)$ with a correct plateau $f_j$, the frequency step $\Delta f$ between different (e.g., adjacent) plateaus can be set to be at least twice (and in some implementations, substantially more) than a typical expected Doppler shift. For example, if the maximum expected velocity of an object in a driving environment is 150 mph ($V_{max} = 67$ m/s), the frequency step can be $\Delta f > 4V_{max}/\lambda_j$. For an example infrared lidar of wavelength $\lambda_j = 900$ nm, this means $\Delta f > 0.3$ MHz.

Processing of continuous signal returns can include some or all of the following. A beating frequency $f_{BEAT}$ is first determined using the current LO plateau $f_k$. The beating frequency is then used to identify a past plateau $f_j$ associated with the TX signal, as the plateau j for which the difference $f_k - f_{BEAT} - f_j$ is the smallest. Next, this difference (attributed to the Doppler shift) is used to determine the velocity $V = \lambda_j (f_k - f_{BEAT} - f_j)/2$ of the reflecting object. In many implementations, since $\Delta f \ll f_0$, the wavelength $\lambda_j$ can be approximated with the wavelength of the unmodulated signal $\lambda_j \approx \lambda_0$ while still ensuring an excellent accuracy. Finally, a range of possible distances $L_{MIN} \leq L \leq L_{MAX}$ can be identified based on the relative positions (within the LO staircase) of the current LO plateau ("detection plateau") $f_k$ and the past plateau $f_j$ associated with the TX beam ("TX plateau") $f_j$. Namely, there can be an uncertainty of where exactly the current moment of time t is within the duration of the detection plateau $f_k$, and a similar uncertainty where exactly the moment of beam transmission $t_1=t-2L/c$ is within the duration of the past TX plateau $f_j$. As a result, twice the minimum distance to the reflecting object, $2L_{MIN}$ is the time between the end of the TX plateau $f_j$ and the start of the detection plateau $f_k$ (as depicted in FIG. 5). Similarly, twice the maximum distance to the reflecting object, $2L_{MAX}$ is the time between the start of the TX plateau $f_j$ and the end of the detection plateau $f_k$ (as also depicted in FIG. 5). Having identified the range of possible distances based on the continuous RX signal, the processing device of the hybrid lidar can identify a distance return within this range $L_{MIN} \leq L \leq L_{MAX}$ and, therefore, identify the exact distance to the reflecting object.

FIG. 6A and FIG. 6B further illustrate identification of a range of distances by a hybrid lidar system using an example directional frequency staircase encoding, in accordance with some implementations of the present disclosure. FIG. 6A illustrates the frequency encoding 600 of FIG. 4C, which uses five different values of frequency 0, $\pm \Delta f$, $\pm 2\Delta f$ (e.g., counted from a reference frequency, which can be a frequency of the unmodulated continuous light source 304 of FIG. 3). Five frequency plateaus are used as an illustration only. It should be understood that any other number N of plateaus (e.g., seven, ten, twenty, etc.) can be used in a similar fashion, with larger number N allowing for determination of the velocity ranges with a higher resolution. Arrows connecting different plateaus indicate various beating frequencies that can be detected by coherent photodetection module of the hybrid lidar (with smaller Doppler shifts not indicated for conciseness). The arrows should be understood as starting at the detection plateaus $f_k$ (plateaus of the LO copy at the moment of detection of the RX signals, as described in conjunction with FIG. 5) and ending at the TX plateaus $f_j$ (plateaus of the LO at a prior moment of beam transmission). Accordingly, each arrow points back in time, from the moment of detection to the moment of transmission. Each arrow has an indication of the beating frequency $f_{BEAT}=f_k-f_j$ ascribed to it. For example, a dotted arrow with the beating frequency $f_{BEAT}=0$ is shown connecting two plateaus of equal frequencies (e.g., two $2\Delta f$ plateaus); dashed arrows indicate negative beating frequencies; dash-dotted arrows indicate positive beating frequencies. The directional staircase with resets, illustrated in FIG. 6A, possesses the property that the same beating frequencies $f_k-f_j$ connect plateaus separated by the same number of time intervals $\tau$ (plateau durations) regardless of the specific end values $f_k$ and $f_j$. For example, a zero beating frequency indicates the same plateau (a fast lidar return where the time of flight is at most $\tau$) or plateaus that are separated by four intervening plateaus (time of flight between $4\tau$ and $5\tau$). Similarly, a beating frequency of $+\Delta f$ (or $-4\Delta f$) indicates the time of flight between $3\tau$ and $5\tau$; a beating frequency of $+2\Delta f$ (or $-3\Delta f$) indicates the time of flight between $2\tau$ and $4\tau$; a beating frequency of $+3\Delta f$ (or $-2\Delta f$) indicates the time of flight between $\tau$ and $3\tau$; and a beating frequency of $+4\Delta f$ (or $-\Delta f$) indicates the time of flight between 0 and $2\tau$.

FIG. 6B illustrates identification 610 of the ranges of distances based on beating frequencies by a hybrid lidar that uses the directional frequency staircase encoding of FIG. 6A. Because the total time of flight of the transmitted and reflected signals multiplied by the speed of light c is twice the distance to the reflecting object, 2L, detection of a specific beating frequency confines the value 2L to a particular (known) range of length $2c\tau$ or, equivalently, to a known range of length $c\tau$ for the distance L itself. FIG. 6B shows association of different beating frequencies with various distances. Only one period of distance associations is shown as the interval [0, $5c\tau$] is understood to be repeated (with the same associated beating frequencies) periodically to larger distances with the period of distance $L_0=5c\tau$. More specifically, the beating frequency $+3\Delta f$ is associated with the interval $[c\tau, 3c\tau]$ as well as with the intervals $[6c\tau, 8c\tau]$, $[11c\tau, 13c\tau]$, and so on. In some instances, only one of the RX pulsed signals may have a distance identified to be within any of those intervals. In such instances, L-V disambiguation of the respective pulsed return is complete. In other instances, multiple pulsed returns may be within intervals associated with a specific beating frequency. For example, one pulsed return can be within the interval $[c\tau, 3c\tau]$ while another pulsed return can be within the interval $[6c\tau, 8c\tau]$. Further disambiguation of such returns can be performed using the intensity of the returns, since intensity of reflection from an object located at distances $c\tau \leq L \leq 3c\tau$ can be significantly weaker than the intensity of a return from an object located at distances $6c\tau \leq L \leq 8c\tau$.

In other implementations, any different number $N \neq 5$ of steps in the directional staircase can be used, with various returns still identified within intervals of length $2c\tau$ up to the addition of an integer number of distances $L_0=Nc\tau/2$. For example, if $\tau=0.2$ μs, and N=10, the resolution would be approximately $c\tau=60$ m up to the addition of $L_0=Nc\tau/2=300$ m (or 600 m, 900 m, etc.). Disambiguation of objects located at distances that differ by (an integer number of) $L_0$ can then be enabled using sensing data obtained with pulsed beams and/or intensity data. Increasing the period of phase/frequency encoding increases the resolution distance $L_0$ whereas increasing the number of different phase/frequency values within the period of encoding increases accuracy of disambiguation (decreases $\Delta L$).

Although FIGS. 5 and 6A-B describe disambiguation based on frequency modulation, similar techniques can be deployed using phase or amplitude modulation. For example, a TX beam (and, therefore, its LO copy), may be proportional to $\cos[f_0 t + \phi(t)]$, where $\phi(t)$ is a phase encoding, which can be of any form shown in FIG. 5 (or any other suitable encoding). A difference between the phase of the LO copy of the TX beam, $f_0 t + \phi(t)$, at the time of detection t can be compared (e.g., using a balanced photodetector) with phase $(f_0+f_D)t_1 + \phi(t_1)$ of the TX beam at an earlier moment of transmission $t_1=t-2L/c$. The velocity of the reflecting object can be determined from the Doppler shift $f_D$, as described above. Phase $\phi(t)$ can be identified as belonging to, e.g., k-th interval (plateau) whereas phase $\phi(t_1)$ can be identified as belonging to a different (or, in some instances, the same) j-th interval (plateau). Correspondingly, the difference between the times $t_1-t=2L/c$ can be determined as described above based on the values k and j to within an accuracy $\Delta t$ set by the duration of various intervals (plateaus) $\tau$. Finally, based on the determined time difference, a processing device of the hybrid laser can determine the range of values $[L_{MIN}, L_{MAX}]$ of the distance to the object L. It should be noted that the range of values can include multiple intervals that are separated by the maximum unambiguous range interval $L_0$, e.g., $[L_{MIN}, L_{MAX}]$, $[L_0+L_{MIN}, L_0+L_{MAX}]$, $[2L_0+L_{MIN}, 2L_0+L_{MAX}]$, etc.

Figure 7:
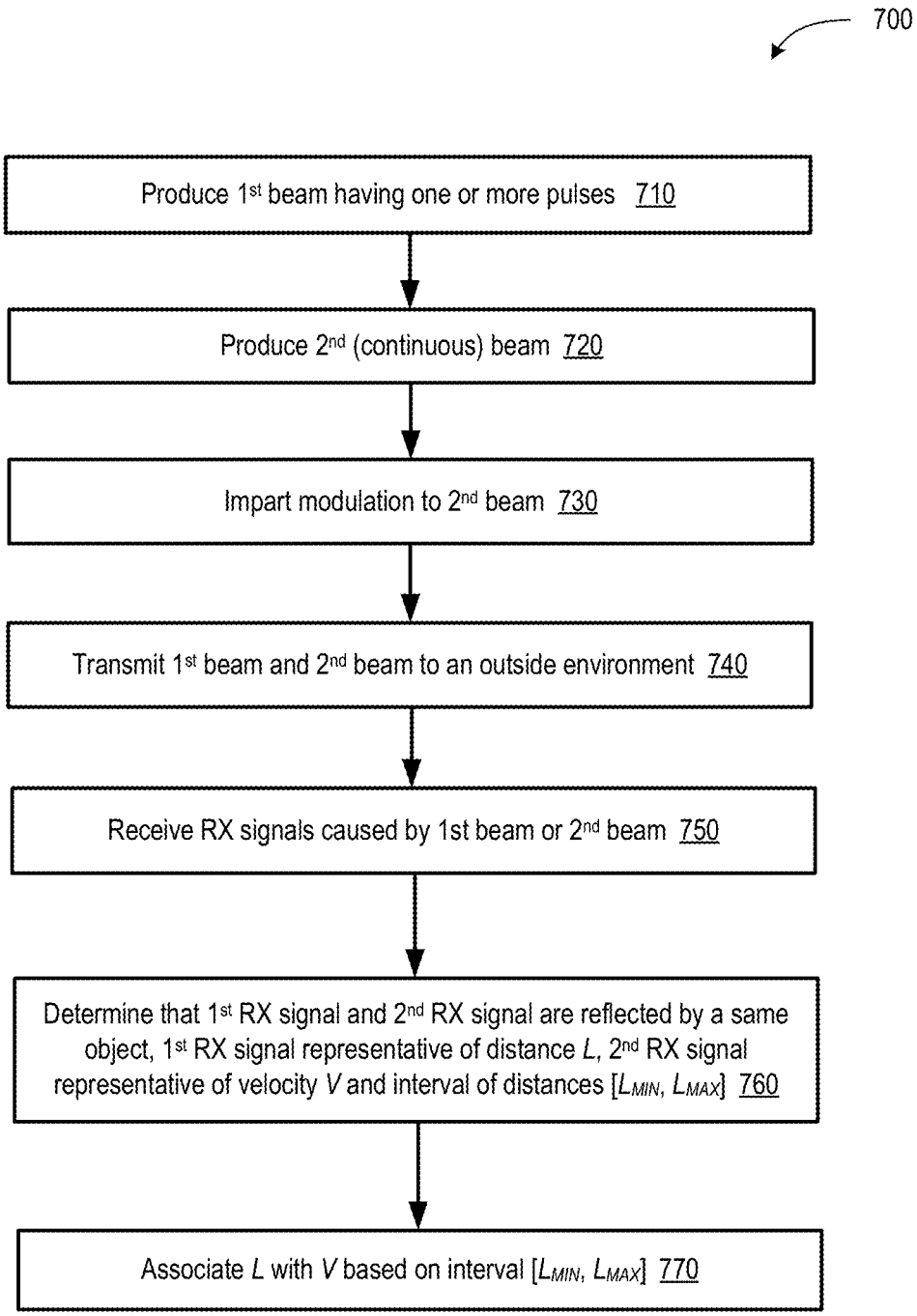
FIG. 7 depicts a flow diagram of an example method of distance-velocity disambiguation in hybrid lidars, in accordance with some implementations of the present disclosure.
Figure 8:
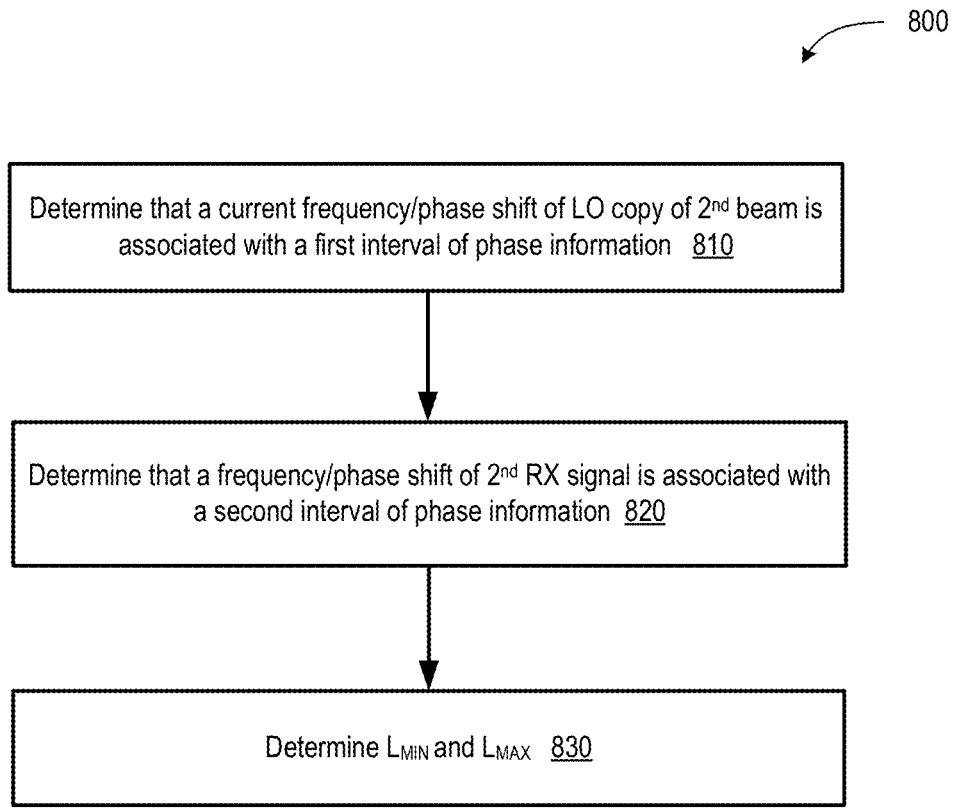
FIG. 8 depicts a flow diagram of an example method of associating ranges of distances to reflecting objects using returns generated by a continuous beam with imparted angle modulation, in accordance with some implementations of the present disclosure.

FIG. 7 and FIG. 8 depict flow diagram of example methods 700 and 800 of using a hybrid lidar for range and velocity detection, in accordance with some implementations of the present disclosure. Methods 700 and 800 can be performed using systems and components described in relation to FIGS. 1-6, e.g., hybrid lidar 222 of the sensing system 220 of an autonomous vehicle. Methods 700 and 800 can be performed as part of obtaining a point cloud for sensing various objects in a driving environment of the autonomous vehicle. Various operations of methods 700 and 800 can be performed in a different order compared with the order shown in FIGS. 7-8. Some operations of methods 700 and 800 can be performed concurrently with other operations. Some operations can be optional. Methods 700 and 800 can be used for determination of range and velocity of objects in outside environments of autonomous vehicles, including driving environments. Methods 700 and 800 can be used to improve coverage, resolution, and speed of detection of objects and their state of motion, as well as decrease costs, size, and complexity of optical sensing systems.

FIG. 7 depicts a flow diagram of an example method 700 of distance-velocity disambiguation in hybrid lidars, in accordance with some implementations of the present disclosure. Method 700 can include producing, at block 710, a first beam comprising one or more pulses and further producing, at block 720, a second beam. It should be understood that the terms "first" and "second" are used herein as mere identifiers and do not presuppose any specific ordering or a temporal/spatial relationship. The second beam can be a continuous beam. Any of the first beam and the second beam can be a coherent beam, e.g., a laser beam. The first beam and/or the second beam can be prepared (e.g., filtered, collimated, polarized, etc.) to produce the light beam of desired properties. For example, the spectrum of the first beam and/or the second beam can be narrowed so that a target linewidth is achieved. In some implementations, for the purpose of separating received signals generated by the first and the second beams, the first beam can have a first spectral content and the second beam can have a second spectral content that is different from the first spectral content. For example, the first beam can have a first central wavelength and the second beam can have a second central wavelength that is different from the first central wavelength of the first beam.

At block 730, method 700 can continue with imparting a modulation to the second beam. In some implementations, the modulation imparted to the second beam can be an angle modulation that includes a frequency modulation and/or a phase modulation. For example, the angle modulation can include at least one of (i) a temporal sequence of frequency shifts, or (ii) a temporal sequence of phase shifts. In some implementations, the phase information (e.g., angle modulation) imparted to the second beam can include at least four different frequency shifts or four different phase shifts. The phase information can be imparted by an optical modulator, such as an acousto-optic modulator or an electro-optic modulator. For example, the phase information can be imparted by an acoustic wave induced in the acousto-optic modulator. The acoustic wave can have a frequency that is an integer number of a frequency shift $\Delta f$. In some implementations, the modulation imparted to the second beam can be an amplitude modulation. In some implementations, phase information can be imparted by a phase modulator, such as a Mach-Zehnder modulator, or other suitable devices.

At block 740, method 700 can continue with transmitting the first beam and the second beam to an outside environment. In some implementations, the first beam and the second beam can be combined and transmitted along a same optical path. At block 750, method 700 can continue with receiving, from the outside environment, a plurality of received (RX) signals caused by at least one of the first beam or the second beam. For example, the first beam and the second beam can strike two or more objects (e.g., located along or near the same line of sight) and, correspondingly, generate reflected RX signals from the two or more signals. More specifically, the first beam can be used to identify accurate distances to the two or more objects (e.g., by measuring the time of flight of the respective pulsed signals to and from the objects). The second beam can be used to identify the velocities of the objects (e.g., by detecting the Doppler shifts of the continuous signals). At block 760, method 700 can continue with disambiguating the detected distance returns and the velocity returns. More specifically, the hybrid lidar can determine that a first RX signal of the plurality of RX signals and a second RX signal of the plurality of RX signals are reflected by the same object. The first RX signal can be representative of a distance L to the object and the second RX signal is representative of the velocity V of the object. Additionally, the second RX signal can be further representative of an interval of possible distances to the object $[L_{MIN}, L_{MAX}]$, the interval of possible distances being identified based on the modulation of the second RX signal. For example, the hybrid lidar can include a coherent photodetector configuration to generate an electronic signal representative of a difference between the phase information of the second RX signal and the phase information of the second beam. More specifically, the coherent photodetector can have a first optical input and a second optical input. A coherent photodetector can be an optical system that includes beam splitters, polarizers, optical amplifiers, and one or more balanced photodetectors. Each balanced photodetector can include one or more pairs of photodiodes connected in series and configured to generate ac electrical signals that are proportional to a difference of optical modes input into the photodiodes. Balanced photodetectors can include Si-based, InGaAs-based, Ge-based, Si-on-Ge-based, etc., photodiodes, SiPM diodes, and/or any other suitable devices, which can further be integrated on a single chip, such as a CMOS chip. The first optical input into the coherent photodetector can be the second RX signal (e.g., the continuous part of the reflected beam). The second optical input into the coherent photodetector can be a local oscillator copy of the second beam (e.g., the continuous beam transmitted to the target). At block 770, method 700 can continue with associating the distance L to the object, determined from the first RX signal, with the velocity of the object V determined from the second RX signal, based on L being within the interval $[L_{MIN}, L_{MAX}]$ of possible distances to the object, as determined from the second RX signal.

FIG. 8 depicts a flow diagram of an example method 800 of associating ranges of distances to reflecting objects using returns generated by a continuous beam with imparted modulation, in accordance with some implementations of the present disclosure. Method 800 can be used in combination with method 700 (e.g., as part of block 760 of method 700). Method 800 can be performed by components of the hybrid lidar that perform some of the operations of method 700. In some implementations, some of the components performing method 800 can be different from components that perform method 700. Method 800 will be illustrated below using an example implementation that deploys frequency modulation, but it should be understood that substantially similar operations can be performed in implementations where phase or amplitude modulation is used. Method 800 can include determining, at block 810, that a current frequency, $f_{LO}(t)$, of a local oscillator (LO) copy of the second beam is associated (e.g., $f_{LO}(t)=f_k$) with a first interval (e.g., k-th interval or plateau) of the modulation imparted to the second beam. At block 820, method 800 can continue with determining that a frequency of the second RX signal (e.g., the frequency of the continuous beam return $f_{RX}(t)$) is associated with a second interval (e.g., j-th interval or plateau) of the modulation imparted to the second beam (e.g., that $f_{RX}(t)$ is close to $f_j$, with the difference representing the Doppler shift). At block 830, method 800 can continue with determining a minimum distance to the object $L_{MIN}$ and a maximum distance to the object $L_{MAX}$ using a time delay between the first interval and the second interval (e.g., the number of intervening modulation intervals/plateaus between the j-th interval/plateau and the k-th interval/plateau, as described in conjunction with FIGS. 5-6. In some implementations, blocks 810-830 may be performed (e.g., for improved resolution and/or reliability of detections) using any combination of phase modulation, frequency modulation, and amplitude modulation based on time delays between corresponding modulation intervals of the RX signals and LO copy of the continuous part of the TX beam.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   a first light source configured to produce a first beam comprising one or more pulses;
   a second light source configured to produce a second beam, wherein the second beam is a continuous beam;
   a modulator configured to impart a modulation to the second beam;
   an optical interface subsystem configured to:
      transmit the first beam and the second beam to an outside environment, and
      receive, from the outside environment, a plurality of received (RX) signals; and
   one or more circuits configured to determine that a first RX signal of the plurality of RX signals and a second RX signal of the plurality of RX signals are reflected by a same object, wherein the first RX signal is caused by interaction of the first beam with the object and is representative of a distance to the object and the second RX signal is caused by interaction of the second beam with the object and is representative of (i) a velocity of the object, and (ii) an interval of possible distances to the object, the interval of possible distances being identified based on the modulation of the second RX signal.

2. The system of claim 1, wherein the modulation imparted to the second beam comprises at least one of (i) a temporal sequence of frequency shifts, (ii) a temporal sequence of phase shifts, or (iii) a temporal sequence of amplitude changes.

3. The system of claim 2, wherein the modulation imparted to the second beam comprises at least four different frequency shifts or four different phase shifts.

4. The system of claim 1, wherein the modulator is one of an acousto-optic modulator or an electro-optic modulator.

5. The system of claim 4, wherein the modulation is imparted by an acoustic wave induced in the acousto-optic modulator.

6. The system of claim 1, wherein the first beam has a first spectral content and the second beam has a second spectral content that is different from the first spectral content.

7. The system of claim 6, wherein the first beam has a first central wavelength and the second beam has a second central wavelength that is different from the first central wavelength of the first beam.

8. The system of claim 1, wherein the optical interface subsystem is configured to transmit the first beam and the second beam along the same optical path.

9. The system of claim 1, further comprising a coherent photodetector configured to generate an electronic signal representative of a difference between the modulation of the second RX signal and the modulation of the second beam.

10. The system of claim 9, wherein a first optical input into the coherent photodetector is the second RX signal and a second optical input into the coherent photodetector is a local oscillator copy of the second beam.

11. The system of claim 1, wherein the one or more circuits are configured to:
  determine that a current frequency or a phase shift of a local oscillator (LO) copy of the second beam is associated with a first interval of the modulation imparted to the second beam;
  determine that a frequency or a phase shift of the second RX signal is associated with a second interval of the modulation imparted to the second beam; and
  determine a minimum distance to the object and a maximum distance to the object using a time delay between the first interval and the second interval.

12. The system of claim 1, further comprising a processing device configured to:
  associate the distance to the object, determined from the first RX signal, with the velocity of the object, determined from the second RX signal, based on the distance to the object being within the interval of possible distances to the object, determined from the second RX signal.

13. A sensing system of an autonomous vehicle (AV), the sensing system comprising:
  an optical system configured to:
    produce a first beam comprising one or more pulses, the first beam centered at a first frequency;
    produce a second beam, wherein the second beam is a continuous beam centered at a second frequency different from the first frequency;
    impart an angle modulation to the second beam;
    transmit the first beam and the second beam to an environment of the AV, and
    receive, from the environment of the AV, a plurality of received (RX) signals; and
  a signal processing system configured to:
    determine that a first RX signal of the plurality of RX signals and a second RX signal of the plurality of RX signals are reflected by a same object in the environment of the AV, wherein the first RX signal is caused by interaction of the first beam with the object and is representative of a distance to the object and the second RX signal is caused by interaction of the second beam with the object and is representative of (i) a velocity of the object, and (ii) an interval of possible distances to the object, the interval of possible distances being identified based on the angle modulation of the second RX signal; and
    associate the distance to the object, determined from the first RX signal, with the velocity of the object, determined from the second RX signal.

14. The sensing system of the AV of claim 13, wherein the angle modulation imparted to the second beam comprises at least one of (i) a temporal sequence of frequency shifts, or (ii) a temporal sequence of phase shifts.

15. The sensing system of the AV of claim 13, wherein the signal processing system further comprises a coherent photodetector to generate an electronic signal representative of a difference between the angle modulation of the second RX signal and the angle modulation of the second beam.

16. A method comprising:
  producing a first beam comprising one or more pulses;
  producing a second beam, wherein the second beam is a continuous beam;
  imparting a modulation to the second beam;
  transmitting the first beam and the second beam to an outside environment;
  receiving, from the outside environment, a plurality of received (RX) signals; and
  determining that a first RX signal of the plurality of RX signals and a second RX signal of the plurality of RX signals are reflected by a same object, wherein the first RX signal is caused by interaction of the first beam with the object and is representative of a distance to the object and the second RX signal is caused by interaction of the second beam with the object and is representative of (i) a velocity of the object, and (ii) an interval of possible distances to the object, the interval of possible distances being identified based on the modulation of the second RX signal.

17. The method of claim 16, wherein the modulation imparted to the second beam comprises at least one of (i) a temporal sequence of frequency shifts, or (ii) a temporal sequence of phase shifts.

18. The method of claim 16, wherein the first beam and the second beam are transmitted along a same optical path.

19. The method of claim 16, wherein determining that the first RX signal and the second RX signal are reflected by the same object comprises:
  determining that a current frequency or a phase shift of a local oscillator (LO) copy of the second beam is associated with a first interval of the modulation imparted to the second beam;
  determining that a frequency or a phase shift of the second RX signal is associated with a second interval of the modulation imparted to the second beam; and
  determining a minimum distance to the object and a maximum distance to the object using a time delay between the first interval and the second interval.

20. The method of claim 16, further comprising:
associating the distance to the object, determined from the first RX signal, with the velocity of the object, determined from the second RX signal, based on the distance to the object being within the interval of possible distances to the object, determined from the second RX signal.

* * * * *